(12) United States Patent
Hohlfeld et al.

(10) Patent No.: US 8,830,629 B2
(45) Date of Patent: Sep. 9, 2014

(54) THIN FILM STRUCTURE WITH CONTROLLED LATERAL THERMAL SPREADING IN THE THIN FILM

(71) Applicant: Seagate Technology LLC, Cupertino, CA (US)

(72) Inventors: Julius Kurt Hohlfeld, Eden Prairie, MN (US); Bin Lu, San Ramon, CA (US); Ganping Ju, Pleasanton, CA (US); Amit V. Itagi, Hugo, MN (US); Timothy Klemmer, Fremont, CA (US); Yingguo Peng, San Ramon, CA (US); Yukiko Kubota, Campbell, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/060,187

(22) Filed: Oct. 22, 2013

(65) Prior Publication Data

US 2014/0043947 A1    Feb. 13, 2014

Related U.S. Application Data

(63) Continuation of application No. 13/435,793, filed on Mar. 30, 2012, now Pat. No. 8,576,515, which is a continuation-in-part of application No. 12/962,928, filed on Dec. 8, 2010, now Pat. No. 8,149,539, which is a continuation of application No. 11/707,280, filed on Feb. 16, 2007, now Pat. No. 7,869,162.

(51) Int. Cl.
*G11B 5/33* (2006.01)
*G11B 5/73* (2006.01)
*G11B 11/105* (2006.01)
*G11B 5/31* (2006.01)
*G11B 5/66* (2006.01)
*G11B 5/00* (2006.01)

(52) U.S. Cl.
CPC ............... *G11B 5/66* (2013.01); *G11B 5/7325* (2013.01); *G11B 11/10584* (2013.01); *G11B 2005/0005* (2013.01); *G11B 2005/0021* (2013.01); *G11B 11/10586* (2013.01); *G11B 5/3133* (2013.01)
USPC ..................................................... 360/125.31

(58) Field of Classification Search
USPC .............. 360/125.31, 125.14, 125.74, 125.3, 360/125.06, 123.01, 123.1; 369/13.4
See application file for complete search history.

(56) References Cited

U.S. PATENT DOCUMENTS

| 5,623,597 | A |   | 4/1997 | Kikinis |           |
|-----------|---|---|--------|---------|-----------|
| 5,737,825 | A | * | 4/1998 | Gray et al. | 29/603.14 |
| 5,754,377 | A | * | 5/1998 | Gray et al. | 360/125.34 |

(Continued)

OTHER PUBLICATIONS

File History for U.S. Appl. No. 11/707,280.

(Continued)

*Primary Examiner* — Allen T Cao
(74) *Attorney, Agent, or Firm* — Hollingsworth Davis, LLC

(57) ABSTRACT

An apparatus includes a non-metallic interlayer between a magnetic data storage layer and a heat sink layer, wherein interface thermal resistance between the interlayer and the heat sink layer is capable of reducing heat flow between the heat sink layer and the magnetic data storage layer. The apparatus may be configured as a thin film structure arranged for data storage. The apparatus may also include thermal resistor layer positioned between the interlayer and the heat sink layer.

20 Claims, 4 Drawing Sheets

(56) References Cited

U.S. PATENT DOCUMENTS

| | | | |
|---|---|---|---|
| 5,815,909 A * | 10/1998 | Gray | 29/603.14 |
| 5,950,301 A * | 9/1999 | Gray et al. | 29/603.12 |
| 5,981,017 A | 11/1999 | Agarwal et al. | |
| 6,566,879 B1 | 5/2003 | Vanek et al. | |
| 6,636,460 B2 | 10/2003 | Akiyama et al. | |
| 6,647,039 B2 | 11/2003 | Fu et al. | |
| 6,773,532 B2 | 8/2004 | Wolf et al. | |
| 7,009,818 B1 | 3/2006 | Arnold et al. | |
| 7,869,162 B2 | 1/2011 | Lu et al. | |
| 8,149,539 B2 | 4/2012 | Lu et al. | |
| 8,196,285 B1 | 6/2012 | Zhang et al. | |
| 8,576,515 B2 * | 11/2013 | Hohlfeld et al. | 360/125.31 |
| 2002/0108743 A1 | 8/2002 | Wirtz | |
| 2003/0096077 A1 | 5/2003 | Ju et al. | |
| 2004/0240327 A1 | 12/2004 | Sendur et al. | |
| 2005/0041950 A1 | 2/2005 | Rottmayer et al. | |
| 2005/0092924 A1 | 5/2005 | Secundo et al. | |
| 2005/0150887 A1 | 7/2005 | Taya et al. | |
| 2005/0202287 A1 | 9/2005 | Lu et al. | |
| 2005/0221049 A1 | 10/2005 | Inoue et al. | |
| 2005/0242382 A1 | 11/2005 | Daughton et al. | |
| 2006/0088655 A1 | 4/2006 | Collins et al. | |
| 2007/0026263 A1 | 2/2007 | Kubota et al. | |
| 2007/0035013 A1 | 2/2007 | Handa et al. | |
| 2007/0048552 A1 | 3/2007 | Soeya | |
| 2007/0217069 A1 * | 9/2007 | Okada et al. | 360/126 |
| 2008/0093336 A1 | 4/2008 | Lee et al. | |
| 2008/0180677 A1 | 7/2008 | Gordley | |
| 2010/0112486 A1 | 5/2010 | Zhang et al. | |
| 2011/0210095 A1 * | 9/2011 | Sasaki et al. | 216/22 |
| 2012/0194942 A1 | 8/2012 | Hohlfeld et al. | |
| 2013/0083429 A1 * | 4/2013 | Macken et al. | 360/125.03 |

OTHER PUBLICATIONS

File History for U.S. Appl. No. 12/962,928.
File History for U.S. Appl. No. 13/435,793.

* cited by examiner

THIN FILM STRUCTURE WITH CONTROLLED LATERAL THERMAL SPREADING IN THE THIN FILM

CROSS REFERENCE TO RELATED APPLICATIONS

This application is a continuation of U.S. application Ser. No. 13/435,793 filed on Mar. 30, 2012, now U.S. Pat. No. 8,576,515, which is a continuation-in-part application of U.S. application Ser. No. 12/962,928, filed Dec. 8, 2010, now U.S. Pat. No. 8,149,539, which is a continuation application of U.S. application Ser. No. 11/707,280, filed Feb. 16, 2007, now U.S. Pat. No. 7,869,162, to which priority is claimed, and which are hereby incorporated herein by reference in their entireties.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The present invention relates to thin film structures, and more particularly, relates to a thin film structure with controlled lateral thermal spreading in the thin film.

BACKGROUND INFORMATION

Heat assisted magnetic recording (HAMR) is one type of data storage that has been proposed as a solution for increasing the areal density of recording data. HAMR generally refers to the concept of locally heating a recording medium to reduce the coercivity of the medium so that an applied magnetic writing field can more easily direct the magnetization of the recording medium during the temporary magnetic softening of the recording medium caused by the heat source. HAMR allows for the use of small grain media, which is desirable for recording at increased areal densities, with a larger magnetic anisotropy at room temperature to assure sufficient thermal stability.

HAMR media usually requires a well-controlled thermal profile in order to achieve high track density and provide a good thermal gradient for recording. The use of a heat sink layer in the media has been proposed in order to conduct or direct heat away from the recording layer after writing to limit thermal erasure. However, the heat sink not only conducts heat vertically but also conducts heat laterally. Therefore, employing a media having a heat sink layer can result in the media exhibiting lateral thermal spreading. This lateral thermal spreading during the writing process limits the track density and the size of data bits.

In order to achieve additional increases in data storage capacities, there remains a need for further reduction in the size of data bits written in storage media.

SUMMARY OF THE INVENTION

In one aspect an apparatus includes a non-metallic interlayer between a magnetic data storage layer and a heat sink layer, wherein interface thermal resistance between the interlayer and the heat sink layer is capable of reducing heat flow between the heat sink layer and the magnetic data storage layer.

In another aspect, an apparatus includes a thermal resistor layer between a magnetic data storage layer and a heat sink layer, and a non-metallic interlayer between the magnetic data storage layer and the thermal resistor layer, wherein interface thermal resistance between the interlayer and the magnetic data storage layer is capable of reducing heat flow from the heat sink layer to the magnetic data storage layer.

In yet another aspect, a system includes a heat assisted magnetic recording head, and a heat assisted magnetic recording medium positioned adjacent the heat assisted magnetic recording head, the heat assisted magnetic recording medium including: a non-metallic interlayer between adjacent layers, wherein the adjacent layers include a magnetic storage layer and a heat sink layer, wherein interface thermal resistance between the interlayer and at least one of the adjacent layers is capable of reducing heat flow between the heat sink layer and the magnetic data storage layer.

DETAILED DESCRIPTION

In one aspect, the present invention relates to thin film structures. In various embodiments, the thin film structure can be used in a data storage media such as, for example, magnetic, magneto-optical or HAMR recording media. In another aspect, the thin film structure can be used as a perpendicular, longitudinal or tilted recording medium of a data storage system.

Figure 1:
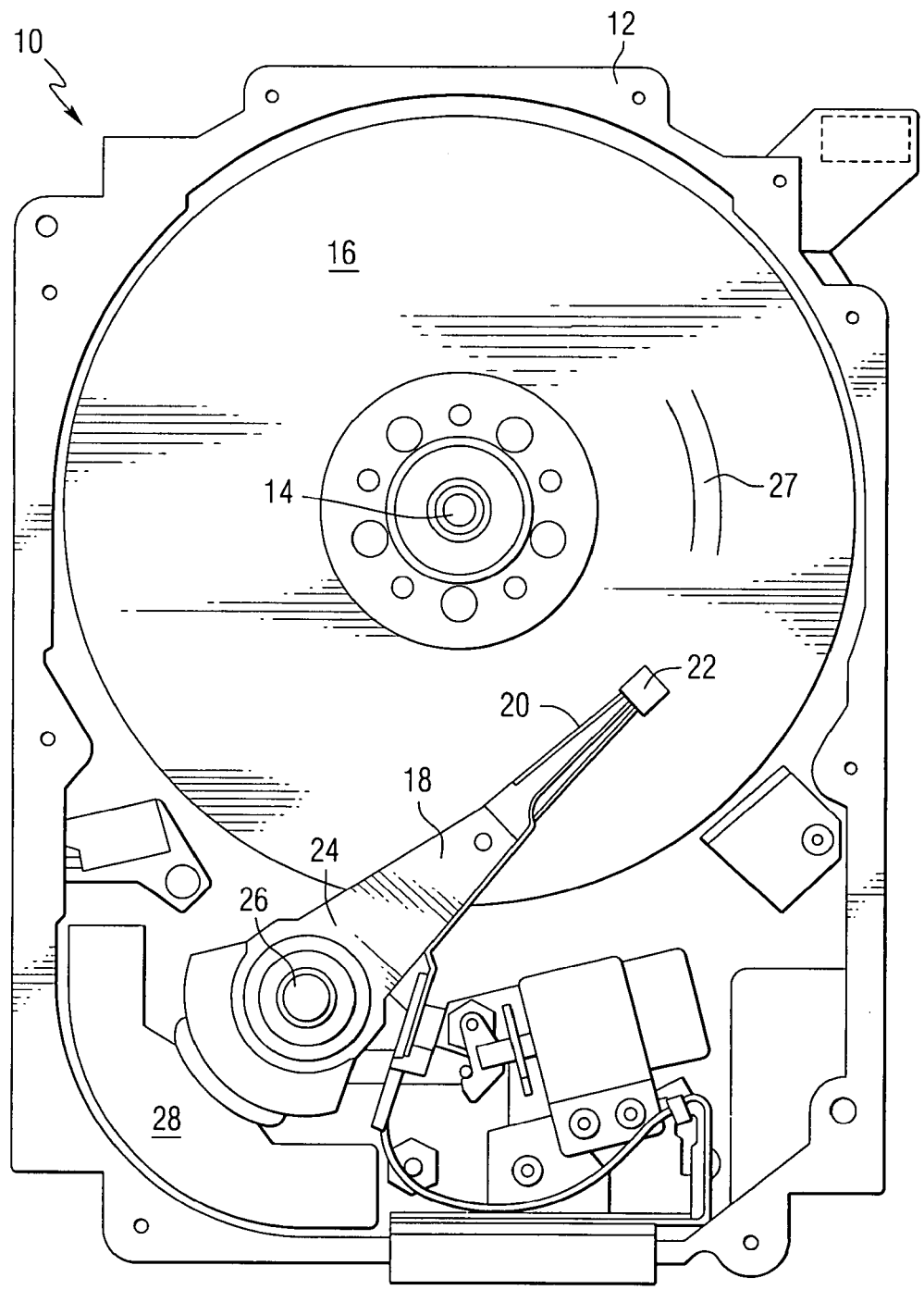
FIG. 1 is a pictorial representation of a data storage device that may utilize a thin film structure, e.g. a recording media, constructed in accordance with an embodiment of the invention.

FIG. 1 is a pictorial representation of a data storage system 10 that can utilize a thin film structure in accordance with an embodiment of this invention. The data storage system 10 includes a housing 12 (with the upper portion removed and the lower portion visible in this view) sized and configured to contain the various components of the data storage system 10. The data storage system 10 includes a spindle motor 14 for rotating at least one storage media, such as a magnetic recording medium 16, which may be a perpendicular, longitudinal and/or tilted magnetic recording medium, within the housing 12. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
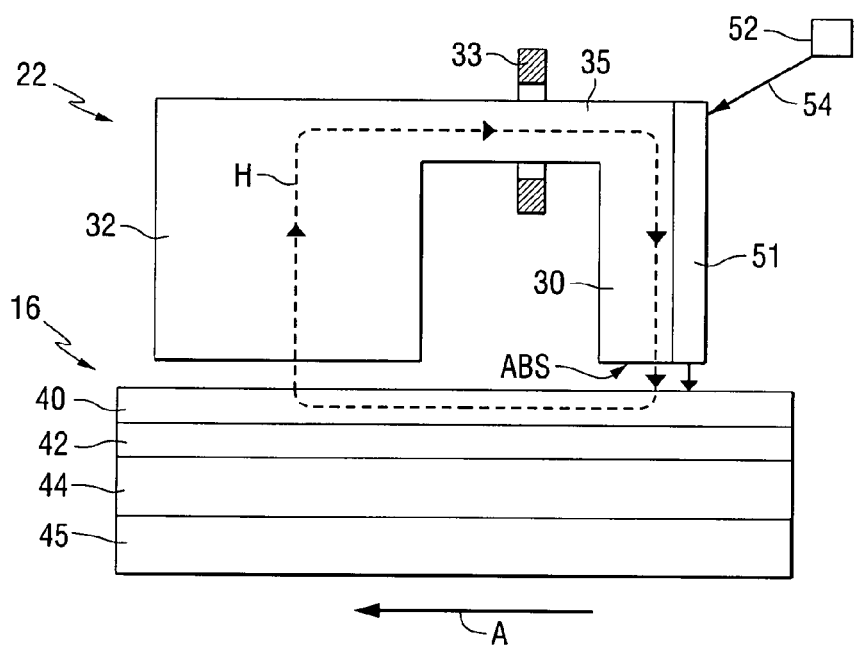
FIG. 2 is a schematic representation of a heat assisted magnetic recording system constructed in accordance with an embodiment of the invention.

FIG. 2 is a partially schematic side view of a data storage write element, such as, for example, recording head 22 and a data storage media such as, for example, recording media 16. Although an example of the invention is described herein with reference to recording head 22 as a HAMR head and the media 16 as a magnetic recording medium for use in association with the HAMR head, it will be appreciated that aspects of the invention may also be used in conjunction with other type recording systems, such as, for example, magneto-optical recording systems. In addition, it will be appreciated that the invention may be used in association with any suitable type of data storage system and is not limited to the examples and illustrations set forth herein.

Still referring to FIG. 2, the HAMR head 22 may include a writer section comprising a main write pole 30 and a return or opposing pole 32 that are magnetically coupled by a yoke or pedestal 35. Flux (H) is directed from the main pole 30 into the recording media 16 and can be returned to the opposing pole 32. A magnetization coil 33 may surround the yoke or pedestal 35 for energizing the HAMR head 22. The recording media 16 is positioned adjacent to or under the HAMR head 22 for movement, for example, in the direction of arrow A. The HAMR head 22 also may include a read section, not shown, which may be any conventional type transducer for reading data. The read section may include, for example, a conventional giant magneto-resistance (GMR) reader, inductive reader, magneto-optical reader, or the like as is generally known in the art.

The HAMR head 22 may also include structure to heat the magnetic recording media 16 proximate to where the write pole 30 applies the magnetic write field H to the recording media 16. Such structure for HAMR can include, for example, an optical waveguide, schematically represented by reference number 51, in optical communication with a light source 52. The light source 52 may be, for example, a laser diode, or other suitable laser light sources for coupling a light beam 54 into the waveguide 51.

FIG. 2 further illustrates a partially schematic side view of the magnetic recording media 16 constructed in accordance with an embodiment of the present invention. The magnetic storage media 16 can comprise a heat sink layer 44 formed on a substrate 45, a magnetic layer 40, such as a recording layer, and a thermal resistor layer 42 positioned between the heat sink layer 44 and the magnetic layer 40. During the writing process, heat is directed into the magnetic layer 40 in order to reduce the coercivity of the magnetic layer 40. Heat applied to the surface of the magnetic layer 40 adjacent the air bearing surface (ABS) of the main write pole 30 will propagate through the magnetic layer 40 and may cause thermal erasure of areas in the magnetic layer 40 adjacent the portion being currently written. In order to conduct or direct applied heat away from the magnetic layer 40, the heat sink layer 44 is positioned below the magnetic layer 40 to draw heat away from the magnetic layer 40. In addition, a thermal resistor layer 42 is positioned to minimize or reduce the flow of heat from the heat sink layer 44 back into the magnetic layer 40.

Referring again to FIG. 2, the magnetic layer 40 can comprise, for example, at least one of FePt, FePt alloys, FePd, FePd alloys, CoPt, CoPt alloys, Co/Pt multilayers, or Co/Pd multilayers. The magnetic layer 40 also can include any of the aforementioned alloys and materials with oxides such as, for example, $Co_2O_3$, $SiO_2$, NiO, $TiO_2$, $ZrO_2$ or $SnO_2$. In one example, the magnetic layer 40 can have a thickness in the range of about 10 nm to about 20 nm.

The heat sink layer 44 can comprise a thermally conductive material, such as a material having a thermal conductivity greater than about 20 W/(mK). Example heat sink layer 44 materials can include Au, Ag, Al, Cu, W, Ru, Cr, Mo, Cu alloys, Ag alloys, or AU alloys. The heat sink layer 44 can have a thickness in the range of, for example, about 20 nm to about 2 mm.

Still referring to FIG. 2, the thermal resistor layer 42 is disposed between the magnetic layer 40 and the heat sink layer 44 to allow heat to flow from the magnetic layer 40 into the heat sink layer 44 while minimizing or reducing the flow of heat from the heat sink layer 44 back to the magnetic layer 40. The thermal resistor layer 42 can comprise a material having a low thermal conductivity, such as, for example, less than about 5 W/(mK). Example thermal resistor layer materials include oxides, nitrides, borides, carbides, or amorphous materials. Such materials can include, for example, at least one of $Al_2O_3$, $SiO_2$, $WO_3$, $Ta_2O_5$, $Nb_2O_5$, $ZrO_2$, SiN, NiP or TiN. In one aspect, the thermal resistor layer materials can be a low thermal conductivity material as well as be a soft magnetic material including, for example, FeCoB, CoZrNi, or CoTaFe. The thermal resistor layer 42 can have a thickness in the range of about 0.25 nm to about 50 nm.

Figures 3A, 3B, 3C:
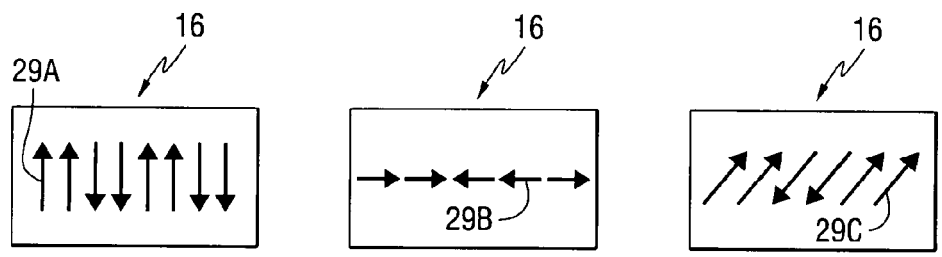
FIG. 3A is a schematic side view of a perpendicular magnetic recording medium in accordance with an embodiment of the invention.
FIG. 3B is a schematic side view of a longitudinal magnetic recording medium in accordance with an embodiment of the invention.
FIG. 3C is a schematic side view of a tilted magnetic recording medium in accordance with an embodiment of the invention.

As shown in FIG. 3A, the magnetic recording medium 16 can be a perpendicular recording medium, as indicated by the orientation of the magnetic grains 29A. As shown in FIG. 3B, the magnetic recording medium 16 can be a longitudinal recording medium, as indicated by the orientation of the magnetic grains 29B. As shown in FIG. 3C, the magnetic recording medium 16 can be a tilted recording medium, as indicated by the orientation of the magnetic grains 29C.

Figure 4:
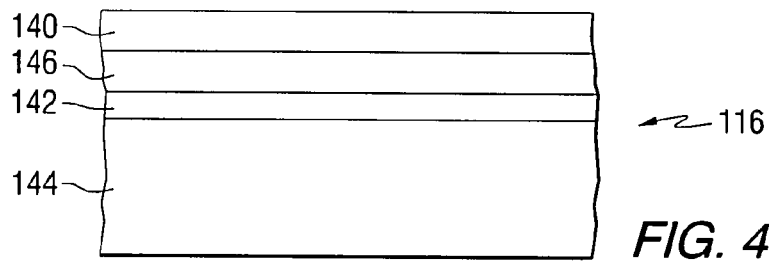
FIG. 4 is a schematic side view of a thin film structure in accordance with an embodiment of the invention.

FIG. 4 illustrates an additional aspect of a thin film structure in the form of a magnetic recording media 116. An interlayer 146 can be disposed between the magnetic layer 140 and the heat sink layer 144. In the example of FIG. 4, the interlayer 146 is disposed between the magnetic layer 140 and the thermal resistor layer 142. The thermal resistor layer 142 can have a thickness in the range of about 0.25 nm to about 50 nm. The interlayer 146 serves to improve the microstructure and magnetic properties of the magnetic layer 140. More specifically, the interlayer 146 can assist in developing the desired orientation, epitaxy, grain size and/or grain separation in the magnetic layer 140. The interlayer 146 can include, for example, Ru, Ru alloys, an oxide such as MgO, or a nitride such as TiN. The interlayer 146 can have a thickness, for example, in the range of about 1 nm to about 30 nm. In another aspect, more than one interlayer may be disposed between the magnetic layer 140 and the thermal resistor layer 142.

Interface resistance refers to thermal resistance between two layers of different materials, for example, a metal and non-metal. The thermal resistance between the metal and non-metal layer is caused by the interface effect of different means of thermal conductivity in the layer materials. For example, in metal, heat is conducted by both electrons and the material lattice, while in non-metals, the heat is conducted primarily via the material lattice. This results in an effective thermal resistor when heat is being conducted across such interface.

Interface resistance can provide the thermal resistance between a metal storage layer and a non-metal interlayer, or the thermal resistance between a non-metal interlayer and a metal heat sink.

In media structures with an oxide (such as MgO) or nitride (such as TiN etc.) as the interlayer (as shown in FIG. 4, item 146), the interface resistance between the interlayer and the magnetic layer 140 could be used to provide the desired thermal resistance. In such structures, the actual thermal resistor layer (as shown in FIG. 4, item 142) thickness could be reduced to a range from 0 to 20 nm.

If no thermal resistor layer is present, the interface resistance between the interlayer and the heat sink layer 144 could be used to provide the desired thermal resistance.

As will be appreciated by those skilled in the art, an overcoat layer, one or more seedlayers and/or other layers typically used to construct thin films may also be used in the thin film structure.

Figure 5A:
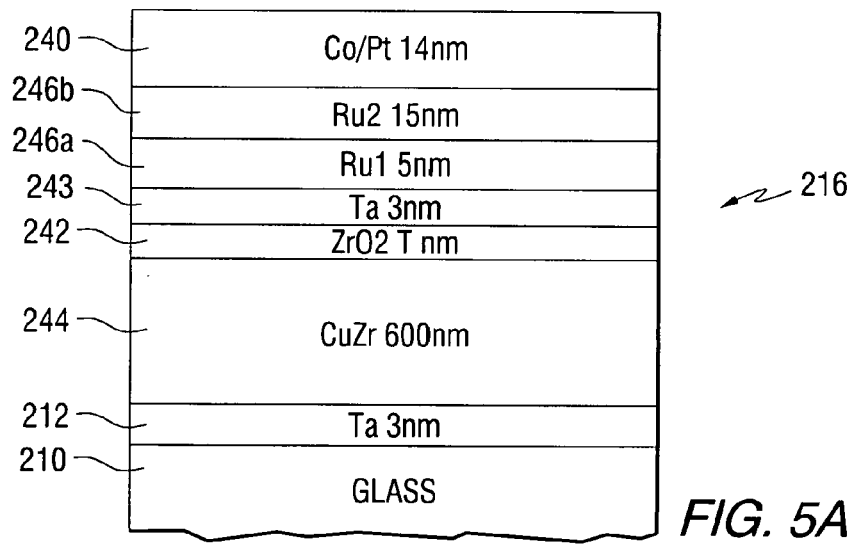
FIG. 5A is a schematic side view of another thin film structure in accordance with an embodiment of the invention.

A sample thin film structure 216, shown in FIG. 5A, was constructed by depositing a 3 nm Ta seedlayer 212 on a glass substrate 210, depositing a 600 nm CuZr heat sink layer 244 on the seedlayer 212, depositing a $ZrO_2$ thermal resistor layer 242 of varying thickness T on the heat sink layer 244, depositing a 3 nm Ta adhesion layer 243 on the thermal resistor layer 242, depositing a 5 nm Ru1 (low pressure processed) first interlayer 246a on the adhesion layer 243, depositing a 15 nm Ru2 (high pressure processed) second interlayer 246b on the first interlayer 246a, and depositing a 14 nm Co/Pt magnetic layer 240 on the second interlayer 246b.

In order to determine the thermal profile of the thin film 216 illustrated in FIG. 5A, an XY scanning pump probe device was set to a pump laser spot size of 532 nm (FWHM) and a probe laser beam size of 405 nm (FWHM). The scanning pump probe scans the plane of the thin film by varying the incident angle and incident pitch of the probe, which produces a translation of the focused laser spot. Using known pump probe techniques, the probe measures the reflectivity of the thin film. In operation, the pump causes a temperature change in the thin film that causes a corresponding change in the reflectivity of the thin film. The change in the reflectivity is measured by the probe signal and, therefore, the scanned probe signal is capable of measuring the thermal profile in the thin film caused by the pump. The obtained thermal profile is a convolution of the spatial thermal profile in the thin film generated by the pump and the spatial profile of the probe.

Figure 5B:
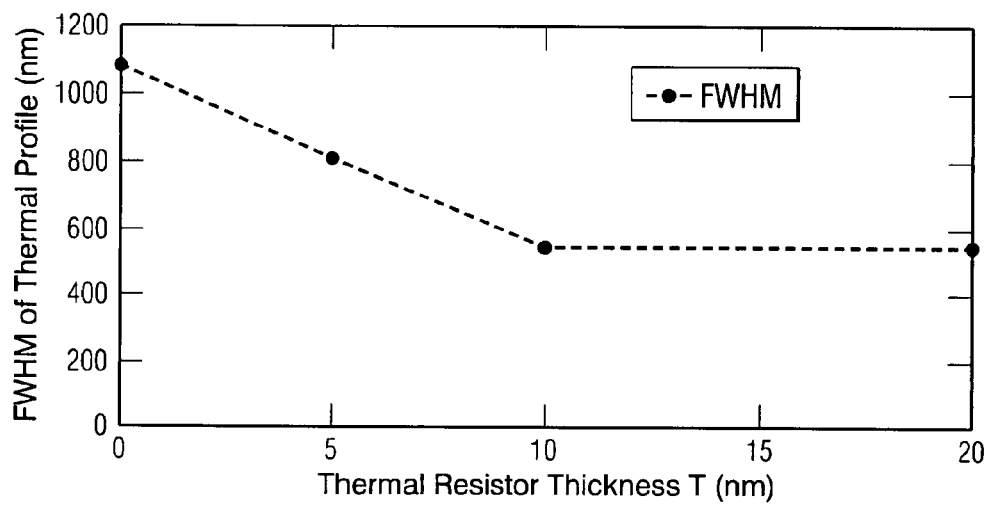
FIG. 5B is a graphical representation of thermal resistor layer thickness versus the full width half maximum (FWHM) of the thermal profile for the thin film structure of FIG. 5A.

The thin film structure 216 was tested using the XY scanning pump probe and FIG. 5B graphically illustrates the FWHM of the measured thermal profile versus the thermal resistor layer 242 thickness T. The presence of the thermal resistor layer 242 results in a reduction of the FWHM and minimizes re-heating effects that occur far away from the thermal source. For example, the measured FWHM is approximately 540 nm for a thermal resistor layer thickness of T=10 nm to 20 nm, which is smaller than the measured FWHM value of approximately 800 nm for T=5 nm and approximately 1100 nm for T=0 nm (i.e. no thermal resistor layer).

Figure 6A:
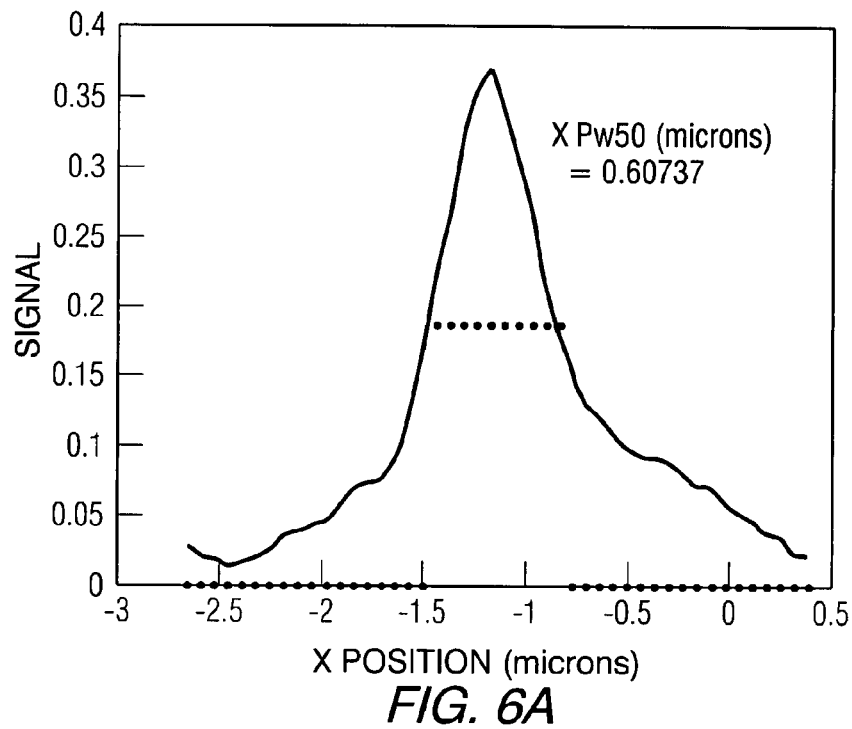
FIG. 6A is a graphical representation of the X-position of the FWHM of a spinning thin film structure.
Figure 6B:
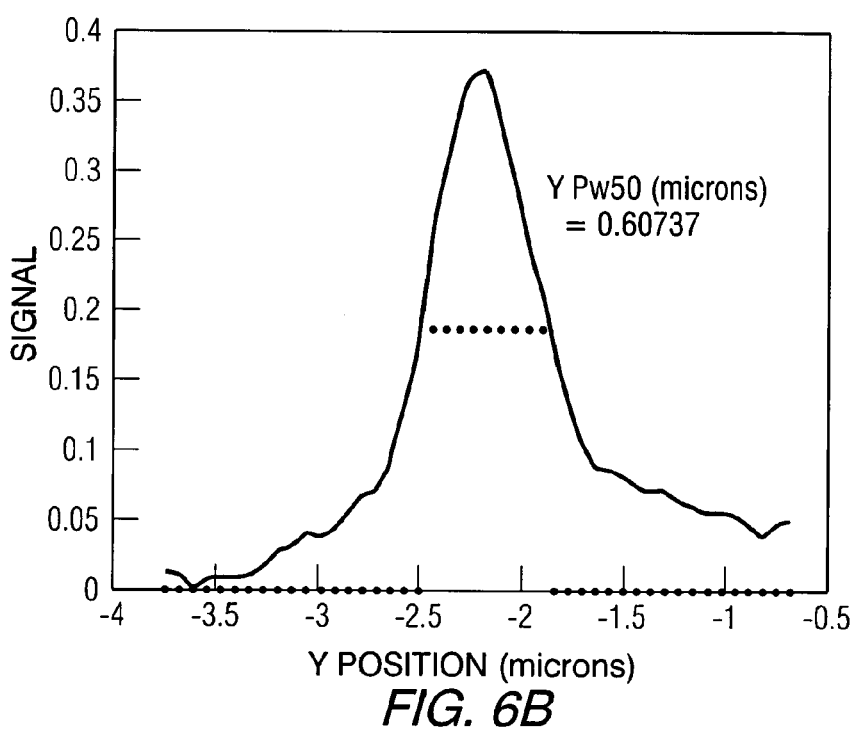
FIG. 6B is a graphical representation of the Y-position of the FWHM of a spinning thin film structure.

To illustrate that the thin film structure 216 can confine the lateral thermal profile when spinning, i.e. when the structure 216 is formed as a recording media that would be spinning during writing/reading, the sample thin film was rotated at approximately 11 m/s and the thermal profile was measured. The measured thermal profile was found to remain substantially symmetric when rotated. This is illustrated in FIGS. 6A and 6B where the FWHM (i.e. the Pw50) along both the X-axis and the Y-axis are substantially identical. This confirms that the thermal resistor layer is able to reduce and confine the lateral thermal profile or spreading when the structure is spinning.

Whereas particular aspects of this invention have been described above for purposes of illustration, it will be evident to those skilled in the art that numerous variations of the details of the present invention may be made without departing from the invention as defined in the appended claims.

What is claimed is:

1. An apparatus, comprising:
   a magnetic data storage layer;
   a heat sink layer; and
   an interlayer between the magnetic data storage layer and the heat sink layer, the interlayer configured to facilitate a first heat flow from the magnetic data storage layer to the heat sink layer and a second heat flow from the heat sink layer to the magnetic data storage layer, wherein a rate of the first heat flow is greater than a rate of the second heat flow.

2. The apparatus of claim 1, wherein the interlayer comprises an oxide or a nitride.

3. The apparatus of claim 1, wherein the interlayer comprises a boride or a carbide.

4. The apparatus of claim 1, wherein the interlayer comprises an amorphous material.

5. The apparatus of claim 1, wherein the interlayer comprises a soft magnetic material.

6. The apparatus of claim 1, wherein the interlayer comprises at least one of $Al_2O_3$, $SiO_2$, $WO_3$, $Ta_2O_5$, $Nb_2O_5$, $ZrO_2$, SiN, NiP, TiN, FeCoB, CoZrNi, and CoTaFe.

7. The apparatus of claim 1, wherein the interlayer comprises Ru or an Ru alloy.

8. The apparatus of claim 1, wherein:
   the interlayer comprises an oxide or a nitride; and
   the heat sink layer comprises Au, Ag, Al, Cu, W, Ru, Cr, Mo, a Cu alloy, an Ag alloy or an Au alloy.

9. The apparatus of claim 1, wherein:
   the interlayer comprises an oxide or a nitride; and
   the magnetic data storage layer comprises at least one of FePt, an FePt alloy, FePd, an FePd alloy, CoPt, a CoPt alloy, a Co/Pt multilayer or a Co/Pd multilayer.

10. The apparatus of claim 1, wherein the interlayer layer has a thickness in the range of about 0.25 nm to about 50 nm.

11. The apparatus of claim 10, wherein the heat sink layer has a thickness in the range of about 20 nm to about 2 mm.

12. The apparatus of claim 1, wherein the interlayer has a thermal conductivity of less than about 5 W/(mK).

13. The apparatus of claim 12, wherein the heat sink layer has a thermal conductivity of greater than about 20 W/(mK).

14. An apparatus, comprising:
   a magnetic data storage layer;
   a heat sink layer; and
   an interlayer comprising MgO between the magnetic data storage layer and the heat sink layer, the interlayer configured to encourage heat flow from the magnetic data storage layer to the heat sink layer and resist heat flow from the heat sink layer to the magnetic data storage layer.

15. The apparatus of claim 14, wherein:
   the heat sink layer comprises Au, an Au alloy, Ag, an Ag alloy, Al, Cu, a Cu alloy, W, Ru, Cr, or Mo; and
   the magnetic data storage layer comprises at least one of FePt, an FePt alloy, FePd, an FePd alloy, CoPt, a CoPt alloy, a Co/Pt multilayer or a Co/Pd multilayer.

16. The apparatus of claim 14, wherein the interlayer further comprises at least one of $Al_2O_3$, $SiO_2$, $WO_3$, $Ta_2O_5$, $Nb_2O_5$, $ZrO_2$, SiN, NiP, TiN, FeCoB, CoZrNi, and CoTaFe.

17. The apparatus of claim 14, wherein the interlayer further comprises Ru or an Ru alloy.

18. The apparatus of claim 14, wherein the interlayer has a thermal conductivity of less than about 5 W/(mK).

19. An apparatus, comprising:
   a heat assisted magnetic recording head; and
   a heat assisted magnetic recording medium adjacent the recording head, the medium comprising:
      a magnetic data storage layer;
      a heat sink layer; and
      an interlayer between the magnetic data storage layer and the heat sink layer, the interlayer configured to encourage heat flow from the magnetic data storage layer to the heat sink layer and resist heat flow from the heat sink layer to the magnetic data storage layer.

20. The apparatus of claim 19, wherein the interlayer comprises MgO.

\* \* \* \* \*